United States Patent
Tsui et al.

[11] Patent Number: 5,806,933
[45] Date of Patent: Sep. 15, 1998

[54] HEAD REST AND RESTRAINT ASSEMBLY

[76] Inventors: Leslie Tsui; Christopher A. Tsui, both of 2180 Pleasant Hill Rd., A-5192, Duluth, Ga. 30136

[21] Appl. No.: 786,978
[22] Filed: Jan. 24, 1997

Related U.S. Application Data

[60] Provisional application No. 60/010,577 Jan. 27, 1996.
[51] Int. Cl.⁶ ............................... A47C 1/10; A47C 7/36
[52] U.S. Cl. ................ 297/391; 297/216.12; 297/487; 297/364; 403/298; 403/359
[58] Field of Search ................................ 297/391, 397, 297/408, 409, 486, 364, 488, 487, 216.12; 192/71, 72; 403/298, 359

[56] References Cited

U.S. PATENT DOCUMENTS

| | | | |
|---|---|---|---|
| 3,640,572 | 2/1972 | Doehler | 297/391 |
| 3,899,042 | 8/1975 | Bonar | 297/487 |
| 3,932,048 | 1/1976 | DuPont | 403/298 |
| 4,786,953 | 11/1988 | Pereira | 297/409 |
| 5,577,859 | 11/1996 | Nau | 403/359 |

FOREIGN PATENT DOCUMENTS

| | | | |
|---|---|---|---|
| 1318721 | 1/1962 | France | 297/487 |
| 1944412 | 6/1971 | Germany | 297/408 |
| 2925484 | 1/1981 | Germany | 297/487 |

*Primary Examiner*—Peter M. Cuomo
*Assistant Examiner*—Anthony D. Barfield
*Attorney, Agent, or Firm*—David P. Kelley

[57] ABSTRACT

A head rest and restraint assembly has, as its principal component, a padded, shaped arm which has one end thereof contained in a mounting member. The contained end has a splined portion thereon which is adapted to mate with an interior splined portion of the mounting member, which comprises a hollow cylinder. Adjustment of the angular arm is accomplished by pushing the end of the arm into the cylinder against the force of a coil sprint until the splines dis-engage, allowing rotation of the arm, when the arm is released, the spring forces the splines into re-engagement, thereby fixing the angular orientation of the arm. Pairs of arms mounted in brackets, for example, can be used with existing vehicular headrests, or a replacement or new head rest may be formed with bores to accept and hold the mounting means.

16 Claims, 4 Drawing Sheets

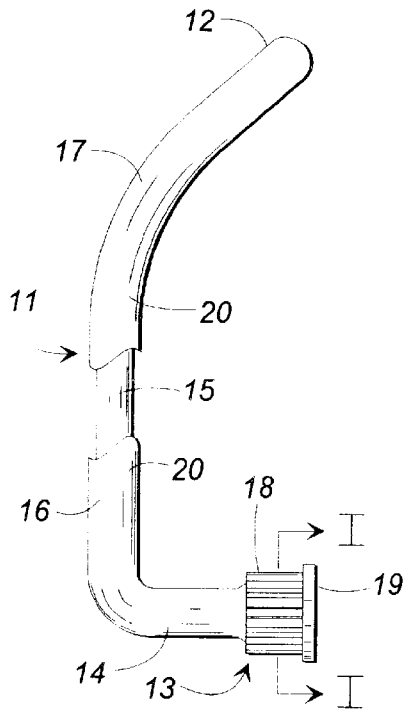
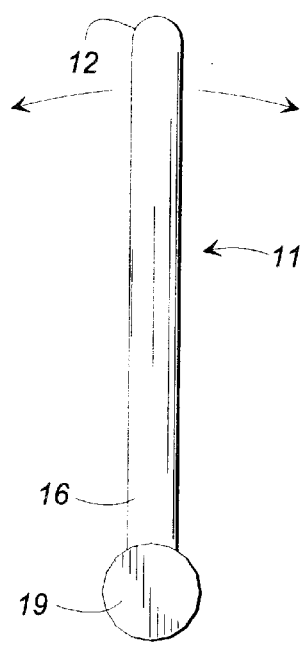
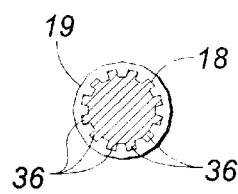
FIG. 2A          FIG. 2B          FIG. 2C
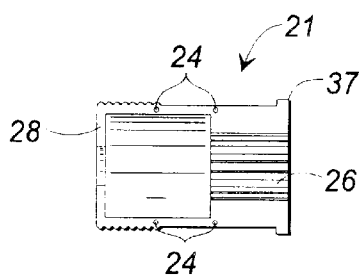
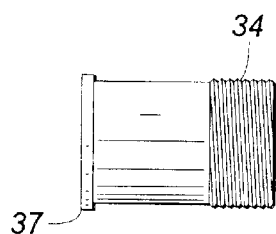
FIG. 3A          FIG. 3B          FIG. 3C
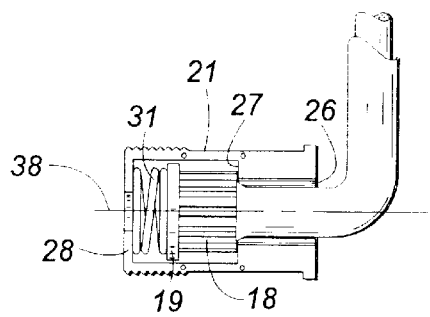
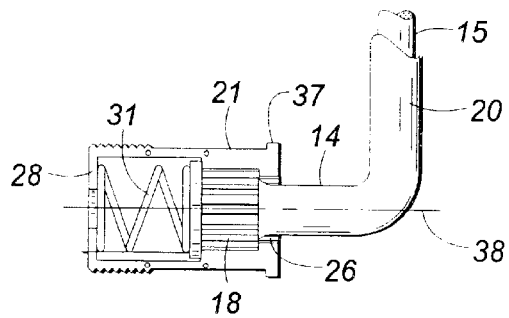
FIG. 4A          FIG. 4B

HEAD REST AND RESTRAINT ASSEMBLY

RELATIONSHIP TO OTHER APPLICATIONS

This application is based upon Provisional Patent Application Ser. No. 06/010,577, filed Jan. 27, 1996.

FIELD OF THE INVENTION

The invention relates to a head rest and restraint assembly, and, more particularly, to a head rest and restraint system for use primarily in vehicles such as automobiles and airplanes.

BACKGROUND OF THE INVENTION

Most vehicles today, such as automobiles, airplanes, and buses, are equipped with seats that have adjustable head rests which are intended not only to provide a comfortable pad or pillow for the head but also to provide a measure of support therefor, which in turn, protects the user's neck in the event of sudden abrupt movements of the vehicle. This support feature reduces the likelihood of whip-lash injury to the user, i.e., passenger. As a consequence, virtually all automobiles are equipped with such head rests for the front seats thereof. Unfortunately, many such automobiles do not have head rests for the rear seat passengers who are, as a consequence, more likely to suffer whip-lash injuries.

Such headrests as are provided by the automobile manufacturers, as well as bus and airplane makers, provide some protection in the longitudinal or axial direction, but do not provide side-to-side restraint or protection. It is not at all uncommon that a person sitting in a seat equipped with a headrest will tend to doze off, for example, and the head will flop to one side or the other, thereby creating a potentially dangerous bend or crook in the neck, and diminishing, to a large extent, the safety characteristics of the headrest. In addition, where, for example, an automobile is struck from the side, whip-lash can occur regardless of whether the head has dropped to one side or the other, or whether the passenger is asleep or awake.

These problems have been recognized heretofore, and various solutions have been suggested in the prior art. One effective arrangement for protecting a passenger against whip-lash, either front-to-back or side-to-side, is a bolster or pillow fashioned in the shape of a horse-collar, which is slipped over the user's head and rests upon the shoulders thereof. The pillow is well padded so that the user's head rests comfortably thereon, regardless of whether or not it is at a sideways angle. Such a pillow is both comfortable and protective, however, it greatly restricts movement of the wearer's head, and many have found it confining to the point of being quite uncomfortable. Because it is so confining, the pillow can also be quite uncomfortable in hot weather. Despite these problems, the use of the horse collar-shaped pillow has been an accepted prior art answer to both the comfort and safety problems discussed in the foregoing. Most adults who use the bolster arrangement accommodate themselves to the restrictions placed thereby on their head movements. This is not the case, however with children who tend to rebel at any physical restrictions placed upon them. An additional inconvenience of the "horse collar" arrangement is that it requires different sizes, e.g., small size for small children, large size for large adults, and intermediate sizes for people of other statures.

What is needed is a head restraint system which allows a degree of movement or positioning of the head without diminution of the comfort of the user, and which can accommodate people of differing sizes, from small children to large adults.

SUMMARY OF THE INVENTION

The basic unit of the present invention is an adjustable arm which can be attached to an existing head rest in a first embodiment of the invention or which, in a second embodiment of the invention, is mounted to its own padded head rest which, in turn, is adapted to be mounted to the back of a passenger seat. In still another embodiment, the padded headrest is adapted to be slipped over an existing head rest and affixed thereto. Most desirably, although not necessarily, a pair of arms is used with one arm on each side of the passenger head, and adjusted as to position to accommodate the physical size of any particular passenger.

In greater detail, each arm comprises a rod, preferably of a heavy-duty plastic material that has a curved portion adjacent or leading to a distal end. The arm itself is encased in a cushion material such as a layer of, for example, foam rubber, which may be, if desired, surrounded by a jacket of leather or other suitable material. The other end of the arm has an L-shaped extension having splines or longitudinal teeth and a stop member at the end, the diameter of which is greater than the diameter of the splined portion. A mounting member for the arm has a bore therein which has internal splines extending from the outer edge of the bore for a short distance into the bore, the internal splines are adapted to mate with the external splines on the L-shaped end of the arm. The internal splines also form a shoulder against which the stop member bears under pressure from a coil spring seated within the bore. The mounting member comprises two longitudinal halves which fit together to form a hollow cylinder after the L-shaped end is fitted within the bore, or half bore, and the coil spring is placed therewithin. When the two halves are assembled or brought together, the L-shaped end of the arm is trapped within the mounting means. The angular orientation of the arm relative to the mounting member can be adjusted by pressing the arm inwardly against the coil spring until the splines dis-engage and the arm can be rotated. When the desired angular orientation is achieved, the arm is released, the splines re-engage, and the spring forces the stop member against the shoulder to hold the arm in a fixed position and to prevent it from sliding out of the cylinder.

When the arms form a spaced pair, the user's head, for example, is not confined or restricted, there being ample space for movement of the head. However, the space thus provided is not so great that the head cannot be rested against one of the arms, which, because of its positive mounting, provides support therefor. Also, the arms are sufficiently close together to arrest any sudden sideways movements of the head, thereby materially reducing the likelihood of whip-lash.

In a first embodiment of the invention, i.e., the application or mounting of the adjustable arm of the invention in a head resting and restraint system, a pair of the arms of the invention are mounted to a bracket member that is designed to fit over the top and down the sides and back of an existing headrest. Clamping members are provided which have enlarged surfaces which bear against the sides of the existing headrest and serve to clamp the bracket member firmly in place without damage to the headrest. The bracket member has first and second enlarged portions or ears which are bored to receive the arm mounting members, which preferably are threaded so as to be screwed into threaded bores in the enlarged portions. The bracket member is held firmly in place on the headrest by means of the clamping members, and the arms can be easily positioned to any desired orientation. Removal of the arm and bracket assembly from the headrest is simply a matter of loosening the clamping members and lifting the bracket off, leaving the headrest in undamaged condition.

In a second embodiment of the invention, primarily designed for use in those vehicles which do not have headrests for the rear seats, but generally do have a shelf extending rearwardly from the top rear of the seat, the headrest-arm assembly comprises a headrest member having mounting means thereon for affixing the headrest to the rearward extending shelf. On either side of the headrest is a threaded bore into which the arm mounting members are screwed. This is best accomplished by an internally threaded adapter mounted in each bore into which the mounting member is screwed. The adjustment of the arms is the same as discussed hereinbefore, and the entire assembly can be quickly mounted to the shelf by means of a mounting plate and bolts.

In another embodiment of the invention, somewhat similar to the first embodiment, the mounting bracket is designed and configured to extend down the face of the existing headrest as well as the back. The front surface of the mounting bracket is padded to form a substitute cushioned surface. In other respects, the third embodiment is similar to the first embodiment.

The arms and mounting means of the present invention are primarily for use in vehicles. However, the universality of the structure is such that it is adaptable to a wide variety of other uses, as will be apparent from the following detailed description, read in conjunction with the accompanying drawings.

DESCRIPTION OF THE DRAWINGS

FIG. 2A is a side elevation view of the arm of the invention;

FIG. 2B is a front elevation view of the arm of FIG. 2A;

FIG. 3 is a cross-section view along the line I—I of FIG. 2A;

FIG. 3A is a side elevation view of one-half of the arm mounting member;

FIG. 3B is a front view of the one-half mounting member of FIG. 3A;

FIG. 3C is an elevation view of the exterior of the member of FIG. 3A;

FIGS. 4A and 4B are views of the relationship and adjustability of the arm and mounting member;

DETAILED DESCRIPTION

Figure 1:
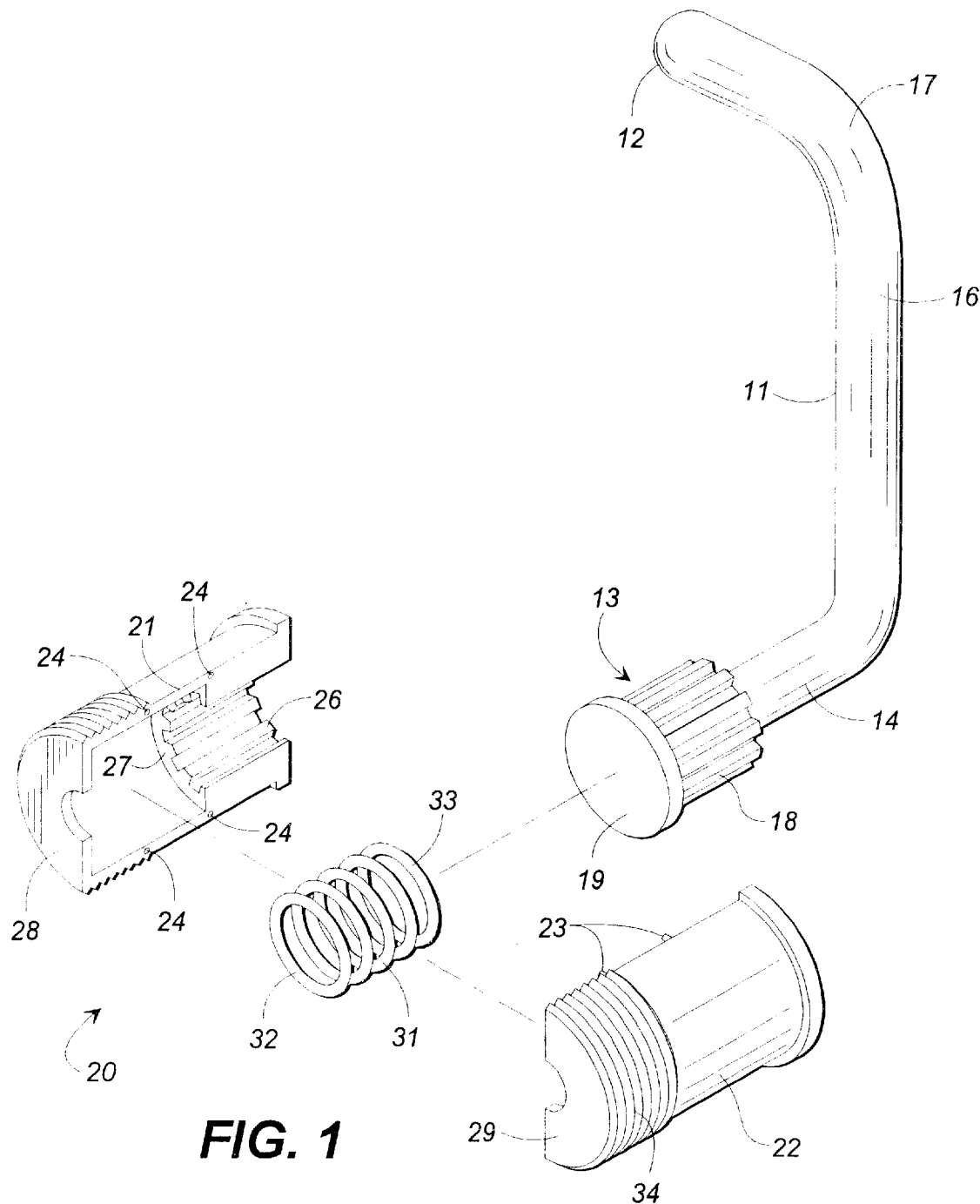
FIG. 1 is an exploded perspective view of the arm and mounting means combination of the invention.

FIG. 1 is an exploded perspective view of a preferred embodiment of a basic component of the invention, which comprises an arm member 11 having a distal end 12 and a proximal end 13 which terminates in an L-shaped portion 14. The portion 16 of the arm extending from the L-shaped bend toward the distal end has a curved portion 17 which preferably lies in the plane of portions 14 and 16 of the arm. Portion 14 of the arm terminates in an enlarged diameter splined portion 18 and an end or stop plate 19.

A mounting member 20 composed of a first half cylinder 21 and a second half cylinder 22 which are substantially mirror images of each other and which, when joined together with the aid of locating pins 23 and locating holes 24, are adapted to embrace and retain the end portion 13 of arm 11. To this end, both half cylinders 21 and 22 have internal splines which form a shoulder 27 against which plate 19 butts to arrest or prevent the movement of end portion 13 out of the assembled cylinder. Each of the half cylinders 21 and 22 has an end wall 28, 29 which together form a seat for a coil spring 31, one end 32 of which bears against end wall 28, 29 and the other end 33 of which bears against end or stop plate 19. In most applications of the invention, mounting member 20 is adapted to be affixed to a headrest by being pressed or screwed into a bore in the headrest, or in a suitable adapter. To this end mounting member 20 may have threads 34 on the exterior thereof which can extend over a portion of the length, or its entirety. Although threads 34 are shown, it is to be understood that the invention embraces other means of affixing the mounting means to the headrest. Thus, as is shown in the figures, other means of mounting are shown which serve equally as well.

In FIGS. 2A, 2B and 2C, the details of arm 11 are shown more clearly. Arm 11 is preferably, although not necessarily, formed of a rod 15 of rigid or high impact plastic, and the spline portion 18 may be formed integral therewith, as well as plate 19. On the other hand, plate 19 could be attached after the rod and spline portion are formed. Rod 15 is preferably covered with a cushioning material 20 which may be of a foam rubber, leather, or other resilient material capable of providing a comfortable resting support for the head. FIG. 2C, which is a sectional view along the line I—I of FIG. 2A, shows that the spline portion 18 is made up of a plurality of equally spaced radially extending splines 36 which, as best seen in FIG. 2A, extend longitudinally along spline portion 18. As can be seen in FIG. 2B, all portions of the arm lie in the same plane. This is a preferred, although not a necessary, configuration.

FIGS. 3A, 3B, and 3C are views one half 21 of the mounting member 20, which was discussed in connection with FIG. 1. The length of the spline portion 26 is preferably no longer than spline portion 18 on arm 11. In addition, member 21, and its partner 22, may have an external flange 37 which serves as a stop member to prevent mounting member 20 from being inserted too far into a headrest or an adapter. In FIG. 3C, member 21 is shown threaded 34 over its entire length. As was pointed out hereinbefore, this is a design choice and depends in large measure on the mounting assembly employed.

FIGS. 4A and 4B are cross-sectional views illustrating the method used to adjust the angular orientation of the arm 11 about the axis 38, which is the axis of the mounting cylinder 20 formed by members 21 and 22 and of the portions 14 and 18 of arm 11. This angular movement of arm 11 is shown by the arrows in FIG. 2B. When it is desired to move the arm 11 to a different angular position relative to the mounting means 20, the proximal end 13 of arm 11 is pushed into the cylinder bore 20 formed by members 21 and 22 against the force of spring 31 until splines 18 disengage from splines 26, as shown in FIG. 4A. The arm may then be rotated to the desired angular position and then released. When released, the arm is driven back by the force of spring 31 until the splines re-engage and stop plate 19 butts against shoulder 27, as shown in FIG. 4B. Inasmuch as the splines have finite width, it is usually necessary to rock the arm 11 slightly until the splines mesh or engage.

Figure 5:
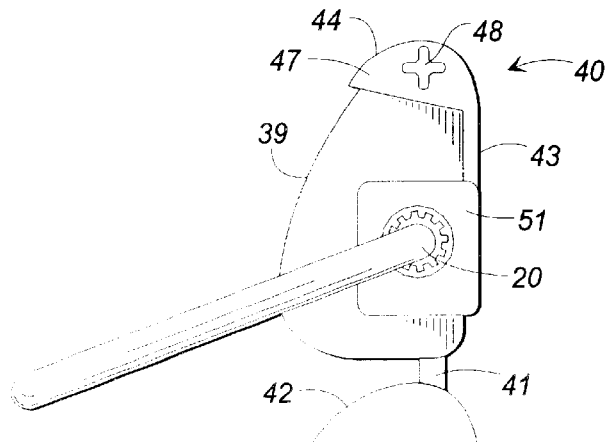
FIG. 5 is a side elevation view of the arm and mounting member in a first illustrative embodiment for use with pre-existing vehicle head rests.
Figure 6:
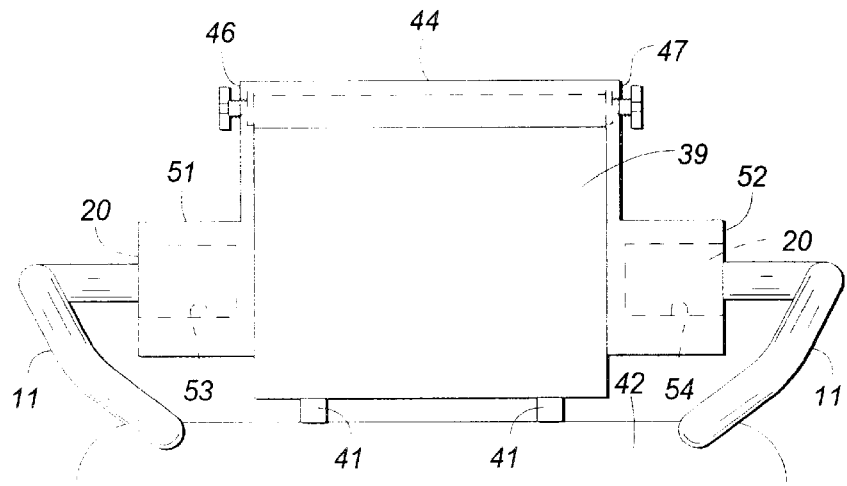
FIG. 6 is a front elevation view of the assembly of FIG. 5.
Figure 7:
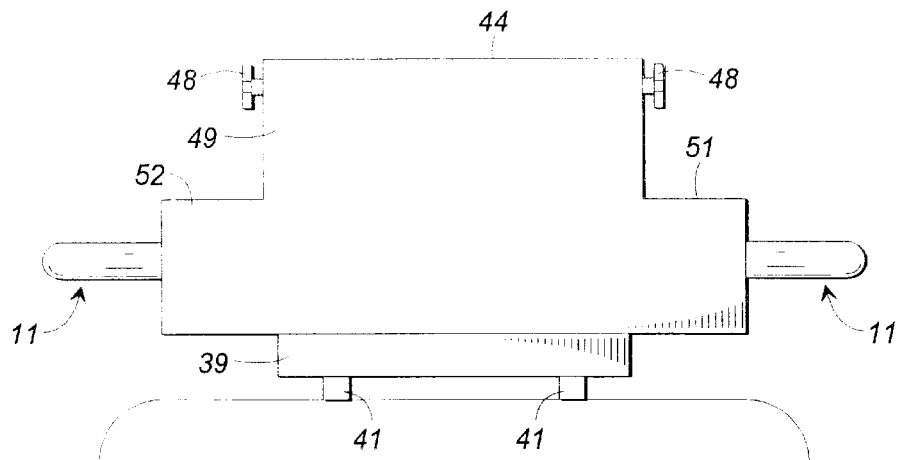
FIG. 7 is a rear elevation view of the assembly of FIG. 5.

FIGS. 5, 6, and 7 illustrate a mounting apparatus 40 for mounting a pair of arms 11 to an existing vehicle head rest 39 adjustably mounted on a rod or rods 41 to a vehicle seat 42. Apparatus 40 comprises a bracket 43 which has a cup shaped or concave transverse member 44 extending across the top of the headrest 39. Member 44 has side portions 46 and 47 which extend slightly down the sides of headrest 39 and in which are mounted clamping screws 48 which function to clamp member 44 to the headrest. Depending from member 44 is a back plate 49 which extends down the back of headrest 39 and which supports first and second mounting receptacles or ears 51 and 52. Ears 51 and 52 have bores 53 and 54 therein for receiving mounting members 21, 22. Bores 53 and 54 may be internally threaded to receive a threaded mounting cylinder 20 as discussed hereinbefore, or they may be of a diameter such that cylinders 20 is a press fit therein, or mounting cylinders 20 may be retained in the bores 53 and 54 by other suitable means such as latching means. In practice or use, bracket 43 is fitted over the top of the headrest 39 and screws 48 are tightened to hold assembly 40 firmly in place. The arms 11 may then be adjusted to accommodate the physical characteristics of the user.

Figure 8:
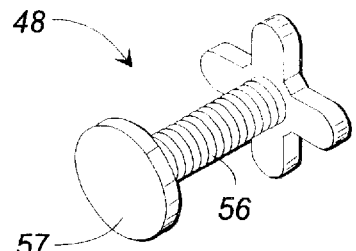
FIG. 8 is a perspective view of a clamping member for use with the assembly of FIGS. 5, 6, and 7.

In order that the existing headrest 39 not be damaged by the clamping screws 48, the screws are designed to supply clamping force with a minimum of damaging forces. In FIG. 8 is shown a preferred structure for the clamping screw or bolt 48. Bolt 48 has a threaded shank portion 56 terminating in a foot 57. Foot 57 is made independently rotatable with respect to shank 56, usually by means of a ball and socket joint between the two of them so that when foot 57 bears against headrest 39, it will not rotate when shank 56 is screwed in to apply the requisite clamping pressure. As can be seen, the other end of clamping screw or bolt 48 terminates in a handle to facilitate screwing member 48 in or out.

Figure 9:
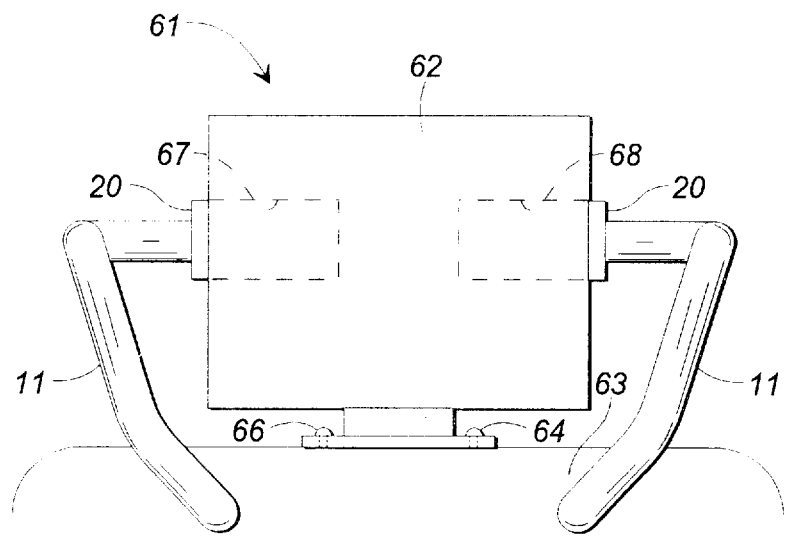
FIG. 9 is a front elevation view of the arm and mounting member of the invention in a headrest assembly for use in vehicles without a headrest.

FIG. 9 illustrates a headrest and restraint assembly for use in vehicles where there is no existing headrest, usually in the rear seat, where a shelf usually extends rearward from the top of the seat back. In such a situation, the assembly 61 of FIG. 9 may be used. Assembly 61 comprises a padded headrest 62 which is bolted or otherwise affixed to the shelf 63 by means of, for example, a mounting plate 64 and bolts 66. On either side of headrest 62 are bores 67 and 68 which are adapted to receive and retain mounting members 20.

Figure 10:
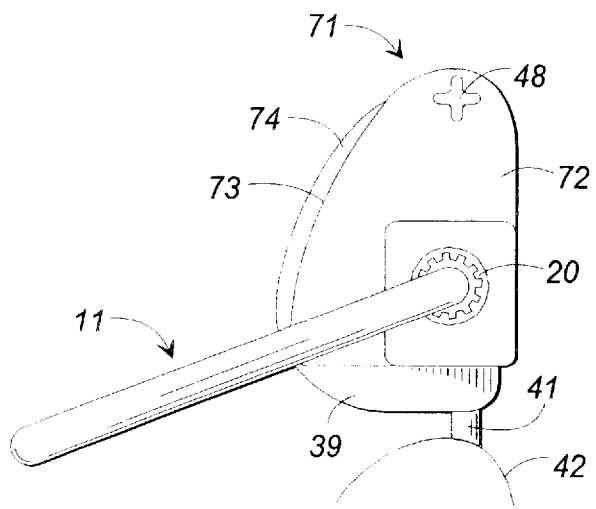
FIG. 10 is a side elevation view of the arm and mounting member of the invention in an arrangement for use with a pre-existing headrest.

FIG. 10 is a mounting assembly 71 which is similar in most respects to that shown in FIGS. 5, 6, and 7. However, assembly 71 comprises a bracket 72 having a face 73 and aide portions which is designed to fit down over an existing headrest 39, covering it substantially completely. On the face 73 of bracket 72 is a layer of padding 74. The installation and operation of assembly 71 is substantially the same as that of assembly 40 in FIG. 5.

The headrest and restraint of the invention, as described in the foregoing, is especially useful for small children or handicapped persons in that the arms can be positioned to provide protective barriers against sudden sideways forces as well as longitudinal forces, while allowing a measure of freedom of movement.

It is to be understood that the various features of the present invention might be incorporated into other headrest arrangements or other types of restraint systems, and that other modifications or adaptations might occur to workers in the art. All such variations and modifications are intended to be included herein as being within the scope of the present invention as set forth. Further, in the claims hereafter, the corresponding structures, materials, acts and equivalents of all means or step-plus-function elements are intended to include any structure, material, or acts for performing the functions in combination with other elements as specifically set forth.

We claim:

1. A headrest and restraint assembly comprising:

an elongated arm having a distal end and a proximal end, said arm having an L-shaped portion defining said proximal end;

said proximal end having a longitudinally extending radially toothed exterior portion wherein the teeth of said toothed portion extend radially outward;

a mounting member having an interior bore for containing said toothed portion comprising a hollow longitudinally extending cylinder having an internally toothed portion adapted to engage with said radially toothed exterior portion within said cylinder and extending a portion of the length of the interior of said cylinder;

said mounting member further comprising first and second longitudinally extending half cylinders, and locating means on said half cylinders for aligning them to form said longitudinally extending cylinder; and resilient means within said cylinder for maintaining said radially toothed portion in engagement with said internally toothed portion.

2. A headrest and restraint assembly as claimed in claim 1 wherein said cylinder has an end wall remote from said internally toothed portion for supporting said resilient means.

3. A headrest and restraint assembly as claimed in claim 1 wherein said proximal end of said arm has a stop plate thereon against which said resilient means is adapted to bear.

4. A headrest and restraint assembly as claimed in claim 3 wherein said internally toothed portion forms a shoulder portion against which said stop plate is adapted to bear.

5. A headrest and restraint assembly as claimed in claim 1 wherein said mounting member has mounting means on an exterior surface thereof.

6. A headrest and restraint assembly as claimed in claim 5 wherein said mounting means comprise a threaded portion extending for at least a portion of the length of said longitudinally extending cylinder.

7. A headrest and restraint assembly as claimed in claim 1 wherein said arm has a curved portion between said L-shaped portion and said distal end.

8. A headrest and restraint assembly as claimed in claim 1 wherein all portions of the elongated arm lie in a single plane.

9. A restraint assembly for mounting to a vehicle headrest comprising, in combination:

first and second elongated arms each having a distal end and a proximal end;

first and second mounting members each having a bore therein having an interior surface for containing and retaining the proximal end portion of one of said arms;

a bracket member having a transversely extending portion, a depending rear portion and first and second side portions;

each of said side portions having a bore therein for receiving one of said mounting members; and means for clamping said bracket member to a vehicle headrest.

10. A restraining assembly as claimed in claim 9 wherein said transversely extending portion has a concave configuration adapted to fit over the top of a vehicle headrest.

11. A restraint assembly as claimed in claim 9 wherein said means for clamping said bracket member comprises first and second bolts at either end of said transversely extending portion.

12. A restraint assembly as claimed in claim 11 wherein each of said first and second bolts has an independently rotatable foot member.

13. A restraint assembly as claimed in claim 9 wherein said bracket member has a front face and said first and second side portions depend from said transversely extending portion.

14. A restraint assembly as claimed in claim 13 wherein said front face has a layer of padding thereon.

15. A headrest and restraint assembly comprising:

an elongated arm having a distal end and a proximal end, said arm having an L-shaped portion forming said proximal end;

said proximal end having a longitudinally extending radially toothed portion;

a mounting member having an interior bore for containing said toothed portion comprising first and second longitudinally extending half cylinders, and locating means on said half cylinders for aligning them to form a hollow longitudinally extending cylinder having an internally toothed portion adapted to engage with said radially toothed portion extending a portion of the length of the interior of said cylinder;

resilient means within said cylinder for maintaining said radially toothed portion in engagement with said internally toothed portion;

said proximal end of said arm having a stop plate thereon against which said resilient means is adapted to bear; and said internally toothed portion forming a shoulder portion against which said stop plate is adapted to bear.

16. A headrest and restraint assembly comprising:

an elongated arm having a distal end and a proximal end, said arm having an L-shaped portion adjacent said proximal end;

said proximal end having a longitudinally extending radially toothed portion;

a mounting member having an interior bore for containing said toothed portion, comprising first and second longitudinally extending half cylinders, and locating means on said half cylinders for aligning them to form a hollow longitudinally extending cylinder having an internally toothed portion adapted to engage with said radially toothed portion extending a portion of the length of the interior of said cylinder;

resilient means within said cylinder for maintaining said radially toothed portion in engagement with said internally toothed portion;

said mounting member having mounting means on an exterior surface thereof comprising a threaded portion extending for at least a portion of the length of said longitudinally extending cylinder.

\* \* \* \* \*